United States Patent [19]

Gutman

[11] Patent Number: 5,737,690
[45] Date of Patent: Apr. 7, 1998

[54] METHOD AND APPARATUS FOR ORIENTING A PLURIDIRECTIONAL WIRELESS INTERFACE

[75] Inventor: Jose Gutman, Boynton Beach, Fla.

[73] Assignee: Motorola, Inc., Schaumburg, Ill.

[21] Appl. No.: 554,617

[22] Filed: Nov. 6, 1995

[51] Int. Cl.$^6$ ............... H04B 10/06; H04Q 7/14
[52] U.S. Cl. ............ 455/38.1; 340/825.03; 340/825.44; 359/172; 455/8
[58] Field of Search ............ 455/41, 54.1, 38.1–38.3, 455/151.2, 32.1, 54.2, 56.1, 63, 8, 517, 524, 525; 359/145, 152, 159, 172; 340/825.44, 825.49, 825.69, 825.72, 825.03; 379/56

[56] References Cited

U.S. PATENT DOCUMENTS

| | | | |
|---|---|---|---|
| 4,438,433 | 3/1984 | Smoot et al. | 455/38.2 |
| 5,087,982 | 2/1992 | Smothers | 359/172 |
| 5,440,559 | 8/1995 | Gaskill | 455/151.2 |
| 5,566,022 | 10/1996 | Segev | 359/159 |

FOREIGN PATENT DOCUMENTS

| | | | |
|---|---|---|---|
| 63-59229 | 3/1988 | Japan | 359/172 |
| 5-153055 | 6/1993 | Japan | 359/172 |

OTHER PUBLICATIONS

A Motorola User Guide, entitled "MC68328 (Dragonball) Integrated Processor User's Manual" by Motorola, Inc., published 1995.

An HP Technical Report, entitled "IrDA Data Link Design Guide" by Hewlett Packard, copyrighted 1995.

An HP Laboratories Technical Report, entitled "The IrDA Platform", by Stuart K. Williams and Ian Millar, published 1994.

An HP Preliminary Technical Data Sheet, entitled "Infrared IrDA Compliant Transceiver", by Hewlett Packard, no publication date.

*Primary Examiner*—Reinhard J. Eisenzopf
*Assistant Examiner*—Lester G. Kincaid

[57] ABSTRACT

A selective call receiver (126) automatically orients a pluridirectional wireless infrared communication interface (220) to allow directional wireless infrared communication between the pluridirectional wireless infrared communication interface (220) of the selective call receiver and a wireless infrared communication interface (134) of a device (132). The pluridirectional wireless infrared communication interface (220) preferably includes more than one directional wireless infrared communication port (310). The selective call receiver (126) automatically orients the pluridirectional wireless infrared communication interface (220) by selecting one directional wireless infrared communication port (310).

1 Claim, 7 Drawing Sheets

METHOD AND APPARATUS FOR ORIENTING A PLURIDIRECTIONAL WIRELESS INTERFACE

FIELD OF THE INVENTION

This invention relates in general to selective call communication devices and more specifically to a method and apparatus for automatically orienting a pluridirectional wireless interface, such as an infrared communication interface comprising a plurality of infrared communication ports, to allow wireless messaging via the pluridirectional wireless interface between selective call communication devices.

BACKGROUND OF THE INVENTION

A selective call communication system typically transmits selective call messages over at least one coverage area for reception by at least one selective call receiver. The wireless transmission over the coverage area is normally done via an omnidirectional transmitter base station to wirelessly transmit the selective call messages in every direction originating from an antenna source at the transmitter base station for reception by the at least one selective call receiver at a location within the coverage area. Additionally, the at least one selective call receiver normally comprises an omnidirectional antenna for receiving the wireless transmitted messages from any direction that they were transmitted.

In certain applications, a wireless communication system utilizes a unidirectional wireless communication interface between a transmitter and a receiver. For example, an infrared communication system unidirectionally transmits wireless messages between two devices. An infrared (IR) transmitter typically transmits a wireless message generally in one direction within a narrow beam. An IR receiver typically receives a transmitted wireless message in a unidirectional fashion. A common example of an IR communication system is represented by wireless IR communication between an IR transmitter at a television remote control unit and an IR receiver at a television set.

Recently, an industry group named the Infrared Data Association has been proposing an open standard for directional infrared data communications. The Infrared Data Association (IrDA) standard normally provides for unidirectional wireless communication between two devices. The IrDA standards group expressly disapproves of using omnidirectional IR transmissions within a coverage area because it can interfere with IR communication between other devices within the coverage area. Therefore, the IrDA usage model is for unidirectional communication where a user of a portable device manually orients an IR interface of a portable device toward an IR interface of another device to effect wireless messaging via IR communication between the portable device and another device, e.g., a stationary device such as a printer. Essentially, the user manually points the portable device toward the stationary device to allow communication between the IR interfaces of the two devices. This point-and-shoot method of aiming a portable device to another device suffers from the disadvantage that the user must first locate the other device and then aim the portable device toward the other device to allow wireless message communication.

Thus, what is necessary is a method and apparatus for automatically orienting a directional wireless interface for communicating wireless messages between devices, such as for communicating using directional infrared wireless messaging between the devices.

DESCRIPTION OF THE PREFERRED EMBODIMENT

Figure 1:
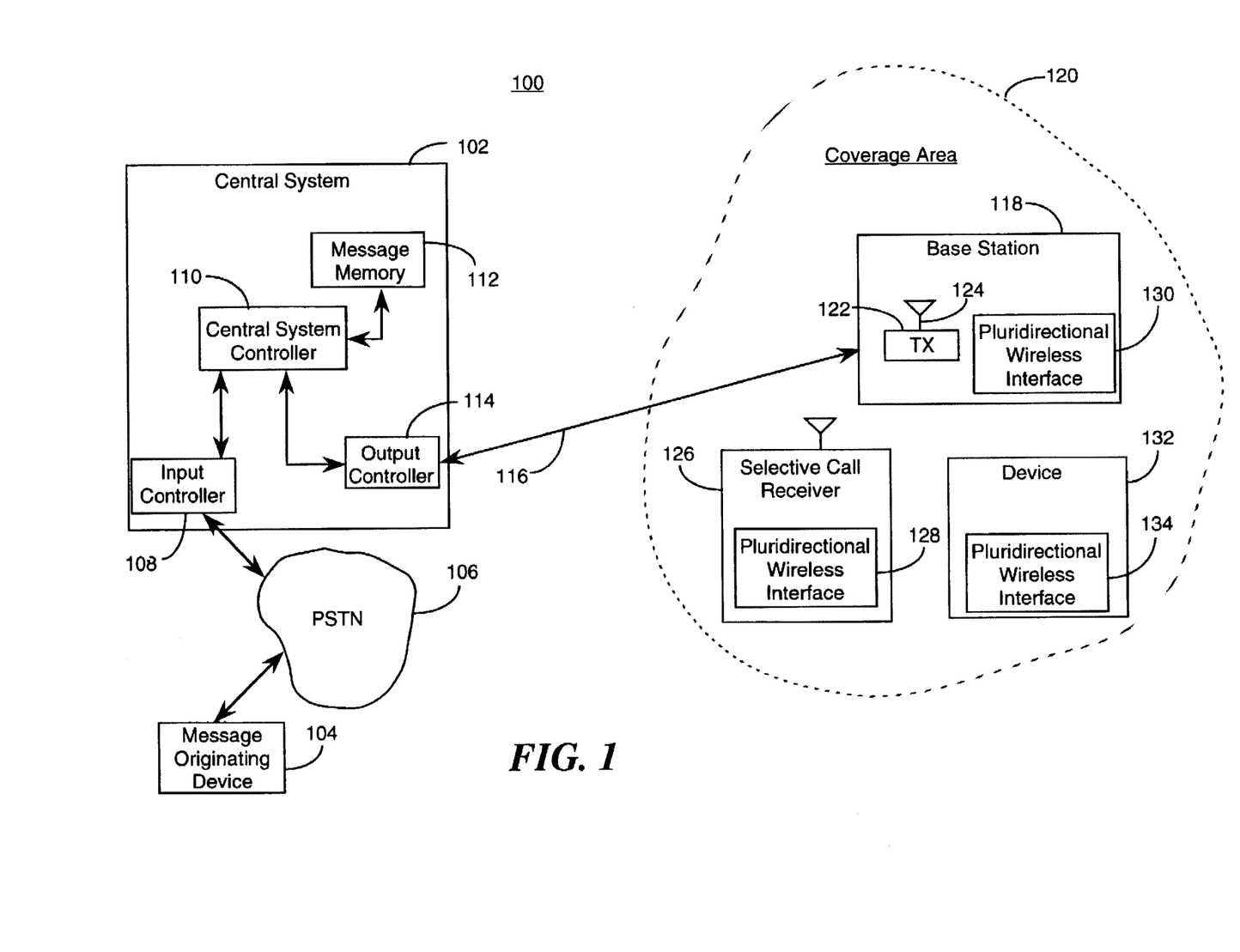
FIG. 1 illustrates a selective call system in accordance with the present invention.

Referring to FIG. 1, a selective call system 100 delivers pages to subscribers thereof, according to the preferred embodiment of the present invention. Preferably, the selective call system 100 utilizes the Motorola Flex™ communication protocol to deliver messages to subscribers of the selective call system 100. The general operation of a selective call system 100 utilizing the Motorola Flex communication protocol is well known in the art, and is described in U.S. Pat. No. 5,168,493 issued Dec. 1, 1992 to Nelson et al, and assigned to assignee of the present invention, and which is hereby incorporated by reference herein.

Alternatively, the selective call system 100 could be implemented utilizing the Motorola ReFlex™ protocol to deliver wireless messages to subscribers and to receive wireless messages therefrom, such as to receive acknowledge-back messages from subscribers to confirm reception of selective call messages transmitted by the selective call system 100 for reception by the subscribers. The general operation of a selective call system 100 utilizing the Motorola ReFlex protocol is more fully described in the following U.S. patent applications assigned to the assignee of the present invention: Ser. No. 08/131,243 entitled "Method and Apparatus for Identifying a Transmitter in a Radio Communication System" filed Oct. 4, 1993 by Simpson et al; Ser. No. 08/398,274 entitled "Method and Apparatus for Optimizing Receiver Synchronization in a Radio Communication System" filed Mar. 3, 1995 by Ayerst, et al; Ser. No. 08/404,698 entitled "Method and Apparatus for Improved Message Reception at a Fixed System Receiver" filed Mar. 15, 1995 by Ayerst et al; Ser. No. 08/498,212 entitled "Forward Channel Protocol to Enable Reverse Channel Aloha Transmissions" filed Jul. 5, 1995 by Ayerst et al; and Ser. No. 08/502399 entitled "A System and Method for Allocating Frequency Channels in a Two-way Messaging Network" filed Jul. 14, 1995 by Wang et al, which are hereby incorporated by reference herein.

However, any conventional wireless communication protocol that supports one-way paging communication or two-way paging communication can be utilized by the selective call system 100 of the present invention.

Specifically, a central system 102 is coupled to at least one message originating device 104, such as via a public switched telephone network 106 (PSTN). The message originating device 104 comprises, for example, a telephonic entry device that utilizes dual tone multi-frequency (DTMF) signaling, or a computing device and modem arrangement utilizing modem signaling, or a page entry terminal device, or other message originating device that can be coupled via a telephone network. Further, a message originating device 104 that comprises a computing device can couple to the central system 102 via other network interfaces, such as via an Internet network interface, via an ethernet network interface, or via other high speed network interface, or even via a dedicated line interface between the message originating device 104 and the central system 102. Furthermore, a message originating device 104 that comprises a wireless network interface can couple to the central system 102 via a wireless network, such as an infrared communication network or a terrestrial or satellite-based radio frequency (RF) communication network.

An input controller 108 comprises a network interface for the central system 102 compatible with the type of network being used to couple messages from a message originating device 104. For example, the input controller 108 comprises a telephone interface to couple messages via the PSTN 106. A central system controller 110 controls the paging function of the central system 102. The central system controller 110 is coupled to the input controller 108 for receiving messages associated with page requests, such as that originated from the message originating device 104.

The central system controller 110 is coupled to a message memory 112 for storing messages and associated information. The message memory 112 is preferably a non-volatile memory. The central system controller 110 is also coupled to an output controller 114 for transmitting outbound pages containing messages or information for subscribers of the central system 102.

The output controller 114 is coupled via a system communication link 116 to at least one base station 118 that is typically located in a predefined coverage area 120. The base station 118 normally comprises a transmitter 122 coupled to an omnidirectional antenna 124 for transmitting wireless messages over the coverage area 120. The coverage area 120 comprises a region, such as a geographical region, for conducting wireless message communication between the base station 118 and at least one selective call receiver 126 (pager). In a ReFlex communication system, the selective call receiver 126 (a two-way pager) would comprise a transceiver to allow the two-way pager to transmit wireless messages to the central system 102, such as via a transceiver in the base station 118. The selective call system 100 typically comprises a plurality of predefined coverage areas that can cover, for example, a wide geographical territory. A selective call system 100, alternatively, can include coverage areas that span a very localized region, such as a building or even a portion of a building.

The system communication link 116 can comprise a direct wireline communication link, a modem communication link such as over a telephone network, a satellite communication link, an RF communication link, or other contemporary communication linking means, or a combination of the aforementioned communication links. The base station 118 operates to transmit a page (a wireless message) to the selective call receiver 126 located within the coverage area 120.

Further, in a ReFlex-based system, the base station 118 can receive a wireless message transmitted by the selective call receiver 126, such as a wireless message representing an acknowledge-back response. The base station 118 forwards (relays) the acknowledge-back response via the system communication link 116 to the output controller 114 of the central system 102. In a ReFlex-based system, the central system 102 transmits a page to the selective call receiver 126, and then receives an acknowledge-back response therefrom to confirm a message reception status of the page for the selective call receiver 126. This two-way paging communication between the central system 102 and the selective call receiver 126 provides affirmative confirmation to the central system 102 that a page transmitted to the selective call receiver 126 was successfully received thereby.

In the preferred embodiment of the present invention, a device capable of wireless communication with another device preferably comprises a pluridirectional wireless interface. A pluridirectional wireless interface is a directional wireless interface which can be oriented to a selected one direction of a plurality of directions to establish a wireless communication link in the selected one direction. The wireless communication link can comprise one-way wireless message communication or two-way wireless message communication between two devices. Further, the wireless communication interface preferably utilizes a directional wireless communication technology such as infrared (IR) communication, ultrasound communication, and directional RF communication, or a combination of the aforementioned directional wireless communication technologies. In the preferred embodiment, a pluridirectional wireless interface utilizes wireless infrared communication technology that is compatible with the Infrared Data Association (IrDA) standard. A pluridirectional wireless interface capable of wireless infrared communication will be called a pluridirectional wireless infrared communication interface. However, it is understood that other directional wireless communication technology could be similarly utilized in place of the infrared wireless communication technology within the spirit of the present invention.

As shown in FIG. 1, the selective call receiver 126 can comprise a pluridirectional wireless infrared communication interface 128. Also, the base station 118 can likewise comprise a pluridirectional wireless infrared communication interface 130. Furthermore, a device 132, such as a printer or a modem can similarly comprise a pluridirectional wireless infrared communication interface 134. Generally, a first device comprises a pluridirectional wireless infrared communication interface for automatically orienting the pluridirectional wireless infrared communication interface to allow directional wireless infrared communication between the pluridirectional wireless infrared communication interface of the first device and a wireless infrared communication interface of a second device. The structure and operation of a preferred pluridirectional wireless infrared communication interface that is suitable for use in a selective call system 100 will be more fully discussed below.

Figure 2:
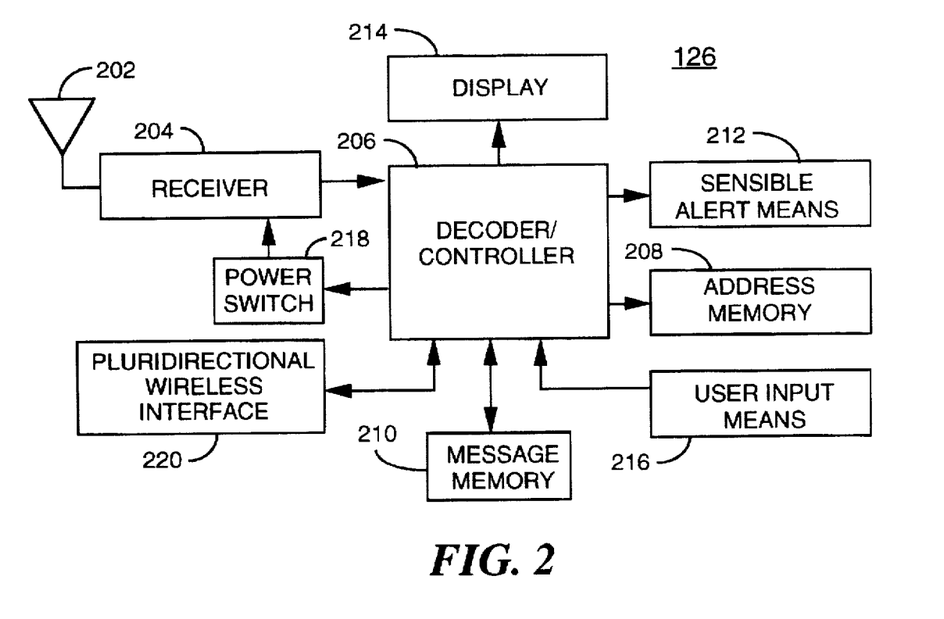
FIG. 2 illustrates a selective call receiver in accordance with a preferred embodiment of the present invention.

Referring to FIG. 2, a selective call receiver 126 is shown according to the preferred embodiment of the present invention. The selective call receiver 126 preferably operates under the Motorola Flex protocol to receive pages from the central system 102. However, any conventional wireless communication protocol that supports one-way paging communication, or two-way paging communication, can be utilized by the selective call receiver 126 as supported by the selective call system 100. The general operation of a selective call receiver utilizing the Motorola Flex™ communication protocol is well known in the art.

The selective call receiver 126 comprises an antenna 202 coupled to a receiver 204 for receiving wireless messages in the selective call system 100 of FIG. 1. The receiver 204 receives pages that were wirelessly transmitted in the selective call system 100. The selective call receiver 126, in a ReFlex protocol capable system, includes a transmitter (not shown) such as for wirelessly transmitting an acknowledge-back confirmation response to the central system 102 operating according to the ReFlex protocol. For example, a two-way paging receiver for use in a ReFlex protocol capable system is preferably a Motorola Tango™ pager which has a microprocessor, or controller, modified to perform operations compatible with the ReFlex protocol. The Tango pager is described more fully in the Motorola Product Family 255 Service Manual published 1995 by Motorola, Inc., and in the Motorola Product Family 255 Series Controller Supplement, published 1995 by Motorola, Inc., which are available for sale to the public from Motorola Paging Products Group, Boynton Beach, Fla. as part No. 6881024B80 and part No. 68881104B36, respectively, and which are hereby incorporated by reference herein.

A controller 206 is coupled to the receiver 204 for decoding a received selective call message, e.g., a received page or a received wireless message. Optionally, an encoder (not shown) is coupled to the controller 206 for encoding wireless messages for transmission from the selective call receiver 126, such as for transmission to the central system 102 according to the ReFlex protocol.

The controller 206 is coupled to an address memory 208 that is preferably a non-volatile memory. The address memory 208 stores predetermined address information, including at least one predetermined address. After the controller 206 decodes a received selective call message (a received page), the controller 206 compares the address information from the selective call message (from the page) to the at least one predetermined address stored in the address memory 208. If the controller 206 finds that a match exists between the address information from the page and the at least one predetermined address in the address memory 208, then the controller 206 stores message information of the selective call message in a message memory 210. The message memory 210 is preferably a non-volatile memory, such as battery backed-up RAM.

The controller 206 is coupled to a sensible alert means 212, such as an audible alert transducer or a tactile alert transducer. The audible alert transducer provides an audible alert to a user of the selective call receiver 126, while the tactile alert transducer provides a silent alert to the user. The type of alert that is provided to a user will typically be pre-configured by a selection made by the user via a user input means 216 that is coupled to the controller 206. The user input means 216 comprises, for example, buttons, keys, touch pads, or switches, such as for providing a user of the selective call receiver 126 with a means of entering information and controlling the functions of the selective call receiver 126. Consequently, after the controller 206 determines a match exists between the address information from the page and at least one predetermined address in the address memory 208, the controller 206 alerts the user of the selective call receiver 126 via the sensible alert means 212 that a page has been received.

The controller 206 is coupled to a display 214, for providing visual information to the user of the selective call receiver 126. The display 214 preferably comprises a liquid crystal display. The display 214, the user input means 216, and the sensible alert means 212, constitute a user interface for the user of the selective call receiver 126.

When the user is informed of the reception of the page, such as via the sensible alert means 212, the user can operate the user input means 216 to request that the message information of the received selective call message be displayed on the display 214. The controller 206, in response to a user activating the user input means 216, couples the message information from the message memory 210 to the display 214 for viewing by the user. Furthermore, in a ReFlex capable system, the user can operate the user input means 216 to activate a transmitter (not shown) at the selective call receiver 126 to send a message back to the central system 102 and thereby to a caller, such as a message originating device 104. The user could send the message as part of an acknowledge-back response transmitted from the selective call receiver 126.

The controller 206 is also coupled to a power conservation module 218 that is further coupled to the receiver 204 to conserve power in a power source (not shown) during predetermined time intervals. The controller 206 operates the power conservation module 218 in accordance with a power conservation scheme in a manner well known in the art.

The controller 206 is coupled to a pluridirectional wireless infrared communication interface 220. In the preferred embodiment, the controller 206 can automatically orient the pluridirectional wireless infrared communication interface 220 to allow directional wireless infrared communication between the pluridirectional wireless infrared communication interface 220 and a wireless infrared communication interface of another device, such as with a pluridirectional wireless infrared communication interface 134 (FIG. 1) of a printer 132 or a pluridirectional wireless infrared communication interface 130 of the base station 118.

Figure 3:
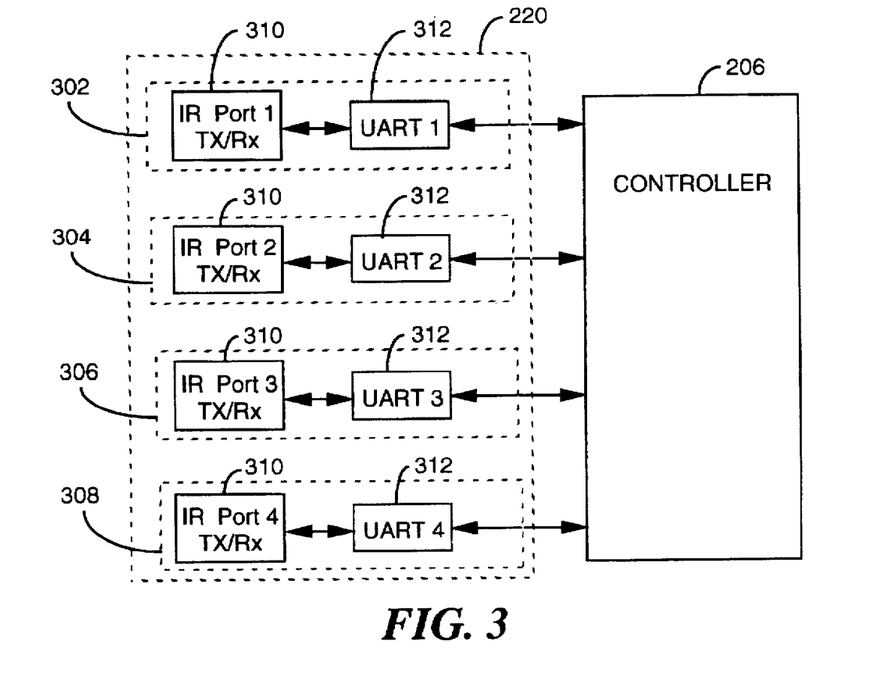
FIG. 3 illustrates a more detailed view of a pluridirectional wireless interface using infrared wireless communication, in accordance with the preferred embodiment of the present invention.

Referring to FIG. 3, an exemplary pluridirectional wireless infrared communication interface 220 is shown, in accordance with a preferred embodiment of the present invention. In this example, the pluridirectional wireless infrared communication interface 220 is coupled to the controller 206 of the selective call receiver 126. The pluridirectional wireless infrared communication interface 220 comprises a plurality of directional infrared communication ports 310 that are wireless and that are preferably manufactured in accordance with the specifications of the IrDA standards organization. As an example, a part suitable for use as an infrared port is model number HSDL-1000, manufactured by the Hewlett-Packard company. A plurality of Universal Asynchronous Receiver/Transmitter (UART) modules 312 are coupled to the plurality of directional wireless infrared communication ports 310, as shown in FIG. 3, to provide, a plurality of directional wireless infrared communication interfaces. Preferably, a part suitable for use as an infrared interfacing UART is model number PC87334VLJ, manufactured by the National Semiconductor company. Furthermore, infrared interfacing UART modules are becoming available as part of controllers and microprocessors, such as the model number MC68328 Dragonball processor, manufactured by Motorola, incorporated. In the example illustrated in FIG. 3, four directional wireless infrared communication interfaces e.g., east directional interface 302, north directional interface 304, west directional interface 306, and south directional interface 308, are utilized to allow directional wireless infrared communication in a plurality of pre-selected directions, e.g., in four pre-selected directions, such as aimed at four compass directions relative to the selective call receiver 126. However, other orientations for the four directional wireless infrared communication interfaces shown in FIG. 3 or other numbers of directional wireless infrared communication interfaces may be used within the spirit of the present invention. For example, a device may use only two directional wireless infrared communication interfaces that are oriented in generally opposing directions relative to a point in the device.

The controller 206, in the preferred embodiment, automatically orients the pluridirectional wireless infrared communication interface 220 of the selective call receiver 126 by selecting one of the plurality of directional wireless infrared communication ports 310. The controller 206 then can establish a two-way wireless infrared communication link via the selected one of the plurality of directional wireless infrared communication ports 310 and a wireless infrared communication interface of a device, such as a printer 132 or the base station 118. The controller 206, therefore, can transmit/receive a wireless message to/from the device via the one of the plurality of directional wireless infrared communication ports selected by the controller. A preferred method by which the controller 206 operates to automatically orient the pluridirectional wireless infrared communication interface 220 will be more fully discussed below.

Figure 4:
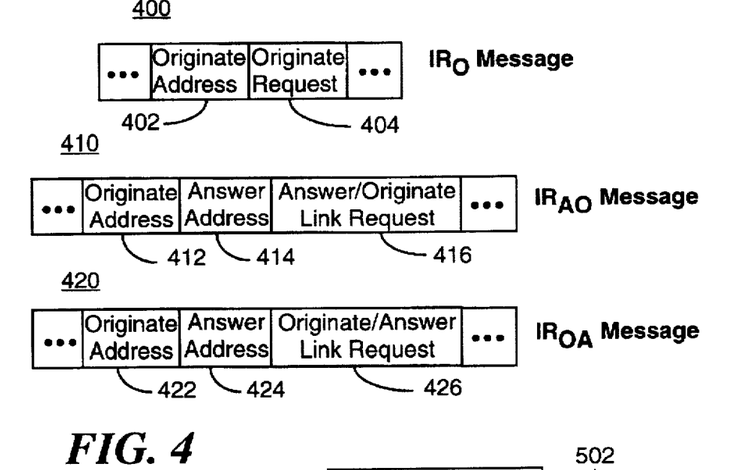
FIG. 4 is a messaging block diagram illustrating exemplary wireless messages transmitted between devices for automatically orienting a pluridirectional wireless interface therebetween, in accordance with the present invention.

Referring to FIG. 4, an exemplary infrared communication system utilizes the following three types of messages to automatically orient a wireless infrared communication interface between two devices. A device that transmits a first message to attempt to establish a wireless infrared communication link is an originating device, and the first message transmitted therefrom is an originate request message 400 (an $IR_O$ message 400). The $IR_O$ message 400 comprises an originate address 402 for identifying the originate device. It also comprises an originate request 404. The originate request 404 includes information that identifies the message as an $IR_O$ message 400. It also can include information that identifies operational and configuration information about the originating device. For example, it can identify the type of message buffer size that the originating device has available to receive and store messages. The originate request 404 can include information about the type of communication that it is looking to establish with another device. For example, the originate request 404 can identify different baud rates, including a preferred baud rate, for synchronizing a wireless messaging communication session between the originating device and another device. The originate request 404 can also include information identifying communication protocol and timing parameters that represent the communication link being established by the originating device. Additionally, the originate request 404 can also include information identifying the type of other device that it is attempting to communicate with. For example, the originating device may want to establish communications with a printing device to be able to print a message using a particular printing language or printing feature. The originating device, alternatively, may want to communicate with a message repeating device that can relay messages from the originating device to another device. For example, the base station 118 (FIG. 1) can relay messages from the selective call receiver 126 to the central system 102. An $IR_O$ message 400, of course, can include other information that the originating device is transmitting to another device.

A second type of message is an answer request to a previous originate message 410 (an $IR_{AO}$ message 410). The $IR_{AO}$ message 410 is transmitted by an answering device that is responding to a previously received message from an originating device. The $IR_{AO}$ message 410 comprises an originate address 412 to identify the originating device whose previously received message is being answered, an answer address 414 to identify the answering device that transmitted the $IR_{AO}$ message 410, and an answer to originate link request 416. The answer to originate link request 416 includes information that identifies the message as an $IR_{AO}$ message 410. It can also include information that identifies operational and configuration information about the answering device. The answer to originate link request 416 can also include information about the type of communication that the answering device wants to establish with the originating device. Additionally, the answer to originate link request 416 can also include information about the type of originating device that the answering device wants to communicate with.

A third message is an originate request to an answer message 420 ($IR_{OA}$ message 420). The $IR_{OA}$ message 420 is transmitted by an originating device that is responding to a previously received message from a specific answering device to attempt to establish a wireless infrared communication link between the originating device and the specific answering device. The $IR_{OA}$ message 420 comprises an originate address 422 to identify the originating device, an answer address 424 to identify a specific answering device, and an originate to answer link request 426. The originate to answer link request 426 can include information about the originating device, about the answering device, and about the type of communication being established between the originating device and the answering device.

Figure 5:
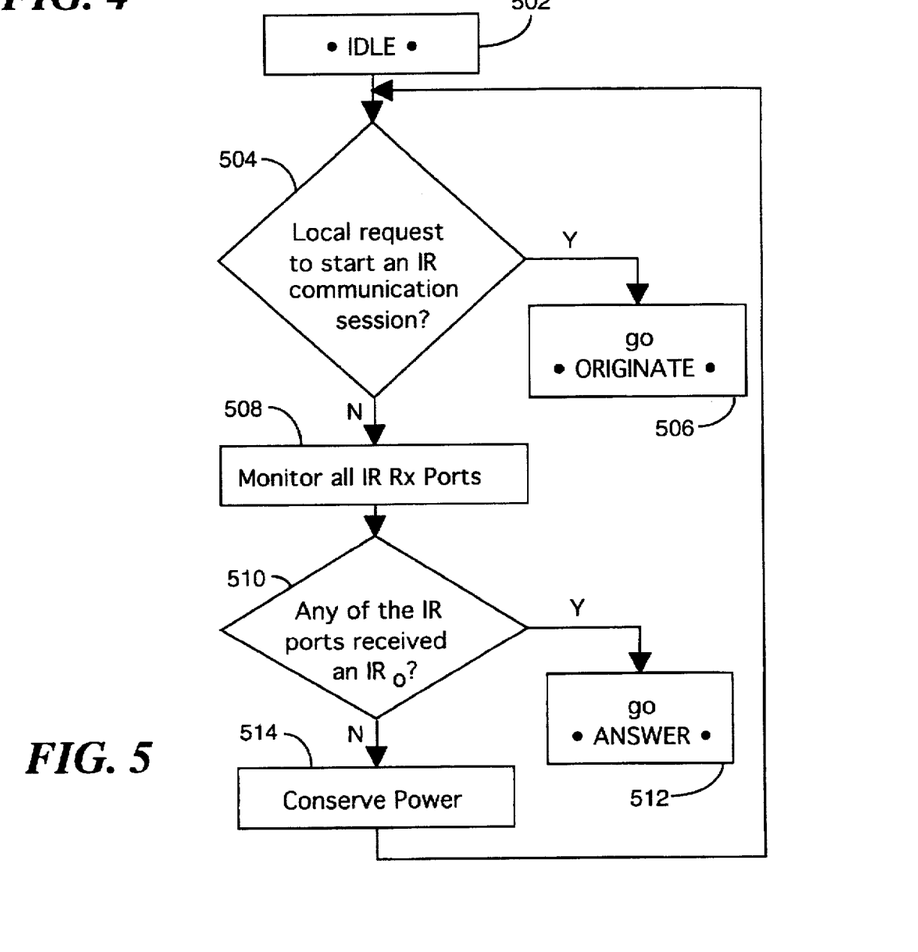
FIG. 5 is a flow diagram illustrating an operational sequence for a device for automatically orienting a pluridirectional wireless interface in accordance with the preferred embodiment of the present invention.

Referring now to FIG. 5, the exemplary flow diagram shown can be utilized by an originating device, or by an answering device, to automatically orient a directional wireless interface between an originating device and an answering device. For example, an originating device, such as the selective call receiver 126 (FIG. 2), is in an idle mode routine, starting at step 502, when it detects a local request to start an infrared communication session, at step 504. The local request normally is a request that is triggered by an operation at the originating device.

For example, a user can press a button at the user input means 216 to cause the controller 206 to automatically orient a pluridirectional wireless infrared communication interface 220, e.g., a wireless infrared communication interface comprising a plurality of directional infrared communication ports, or ports, 310, to establish a wireless communication link between the selective call receiver 126 and another device 132, such as a printer. The local request can also be triggered from an event such as in response to the controller 206 determining that a decoded selective call message requests that the selective call receiver 126 transmit a response wireless message, such as in an acknowledgeback communication system. In this case, for example, the controller 206 automatically orients a pluridirectional wireless infrared communication interface 220 to establish an wireless infrared communication link between the pluridirectional wireless infrared communication interface 220 of the selective call receiver 126 and the pluridirectional wireless infrared communication interface 130 of the base station 118. In this way, the selective call receiver transmits a wireless message to the base station 118 using a wireless infrared communication link between the two devices. Then, the base station 118 relays the wireless message from the selective call receiver 126 to the system communication link 116, a message information of the wireless message being destined for reception by the central system 102.

When the originating device, e.g., the selective call receiver 126, detects a local request, at step 504, the controller 206, at step 506, then goes to an originate routine to begin an originate request sequence. The operation of the controller 206 with respect to step 504 constitutes a local request detection means for detecting a request at the selective call receiver 126 to start an infrared communication session via the pluridirectional wireless infrared communication interface 220. The operation of the originate routine for an originating device will be discussed below.

Alternatively, an answering device in an idle mode routine, at step 502, would not detect a local request, at step 504. An answering device would then monitor, at step 508, a plurality of infrared receiving ports to determine if there is any $IR_O$ message 400 that was wirelessly transmitted by an originating device. If any of the plurality of infrared ports received an $IR_O$ message 400, at step 510, then the answering device would go to an answer routine, at step 512, to transmit an answer request to a previous originate message 410.

A device that does not detect a local request to start an infrared communication session, at step 504, and that does not detect an $IR_O$ message 400 received by any infrared port, at step 510, then can conserve power, at step 514, such as by temporarily removing power from receiver circuits and other circuits in a manner that is well known in the art. Subsequently, the device can, while in the idle mode routine, continue to monitor for either the local request, at step 504, or the $IR_O$ message 400, at step 510.

Figure 6:
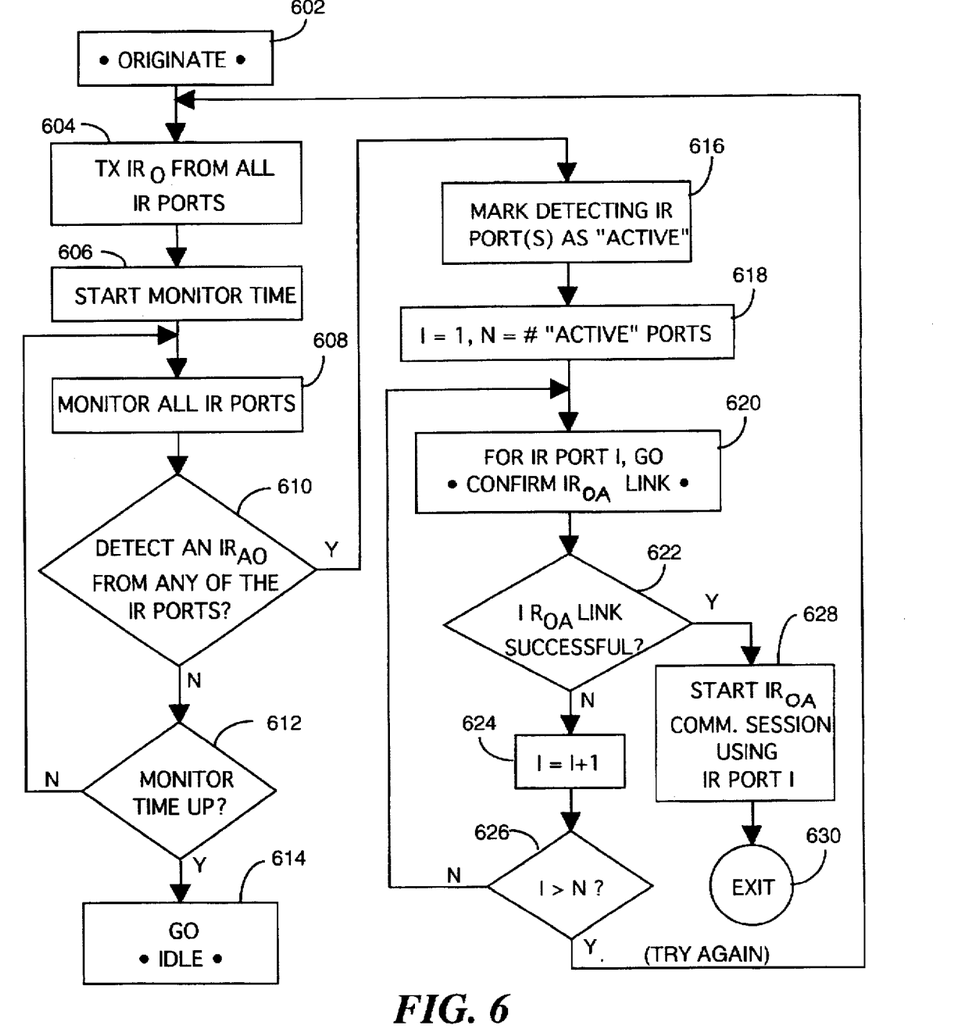
FIG. 6 is a flow diagram illustrating a first operational sequence for an originating device in accordance with the preferred embodiment of the present invention.

Referring now to FIG. 5 and to FIG. 6, an originating device that determines, at step 506, to begin an originate sequence, will go to an originate routine that begins at step 602. The originating device, at step 604, transmits an $IR_O$ message 400 from of its all infrared ports. The originating device then, at step 606, starts a timer for monitoring the infrared receivers of all of its infrared ports, at step 608, for a predetermined time interval, as long as the originating device does not detect an $IR_{AO}$ message 410 responding to its previously transmitted $IR_O$ message 400, the originating device continues to monitor the infrared ports, at step 608. If, at the end of the predetermined time interval, as determined at step 612, the originating device has not detected an $IR_{AO}$ message 410, then the originating device, at step 614, goes back to the idle mode at step 502.

If, during the predetermined time interval the originating device detects, at step 610, that an $IR_{AO}$ message 410 was received by any of the plurality of infrared ports, the originating device, at step 616, marks the receiving infrared ports as active. The originating device then sequentially tests each of the active ports, at step 618, 620, 622, 624 and 626, to establish a successful infrared communication link, as will be discussed below.

For each of the active ports, starting with the first active port, at step 618, the originating device, at step 620, goes to a routine to confirm that an infrared communication link can be established with a specific answering device. When the originating device determines, at step 622, that an infrared communication link has been successfully established, the originating device, at step 628, begins a communication session with the specific answering device using the infrared port that was successfully confirmed at step 620. Then, at step 630, the originating device exits the wireless interface orientation sequence to continue the established infrared communication session with the answering device. However, if after testing all of the active ports, at step 626, the originating device has not been successful in establishing a wireless infrared communication link, then the originating device, in this preferred embodiment, will try again to establish a wireless infrared communication link, at step 604, by transmitting the $LR_O$ message 400 from all of its plurality of infrared ports. Therefore, if after receiving an $IR_{AO}$ message 410 from a specific answering device, at step 610, the originating device is not able to successfully establish a wireless infrared communication session with the specific answering device, at steps 620, 622, 624, and 626, the originating device will try again to establish a wireless infrared communication link with any answering device. An operational sequence with respect to an answering device is described hereinafter with respect to FIG. 7.

Figure 8:
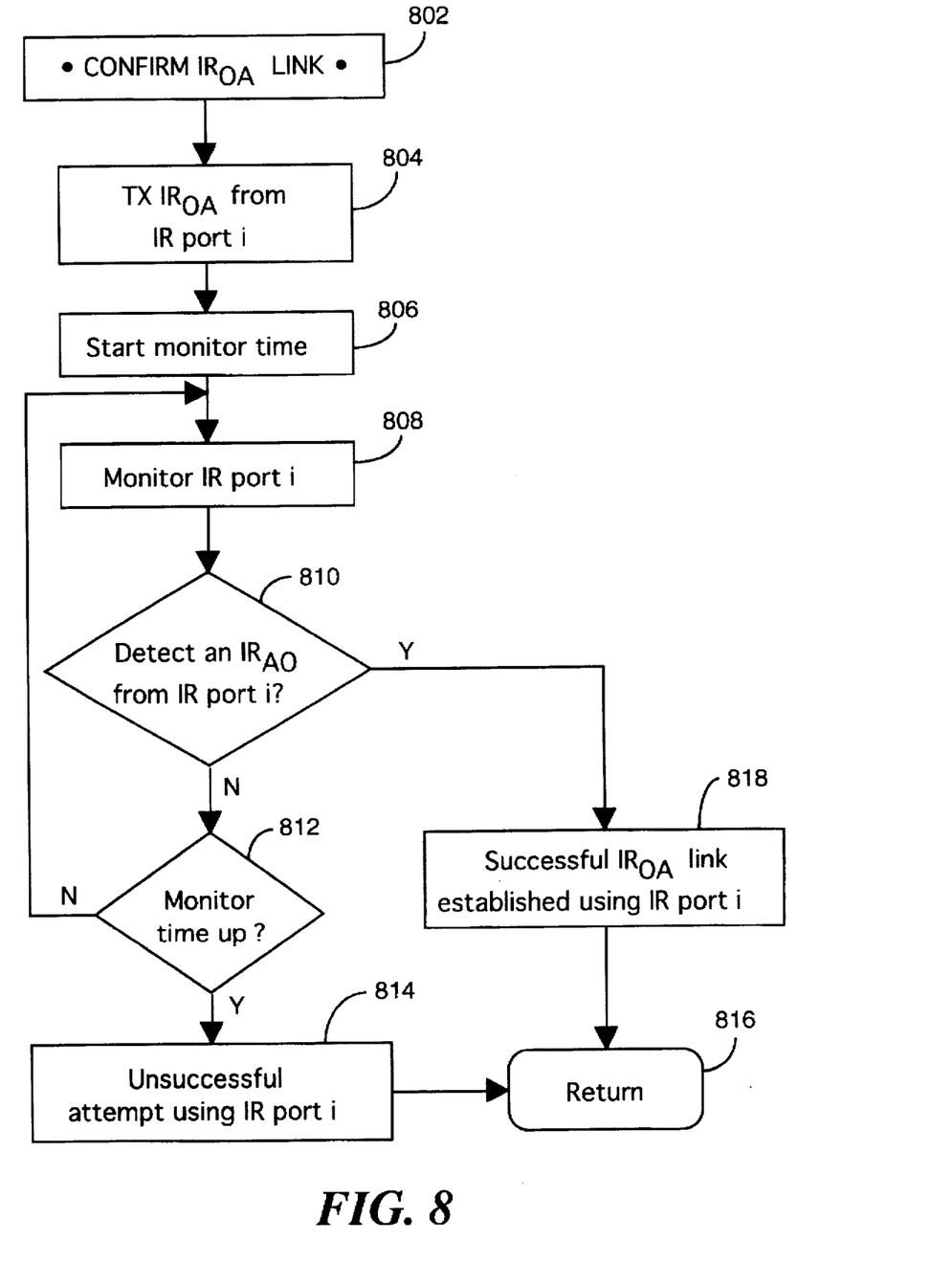
FIG. 8 is a flow diagram illustrating a second operational sequence for an originating device in accordance with the preferred embodiment of the present invention.

Referring now to FIG. 6 and to FIG. 8, while attempting to establish a successful communication link with a specific answering device, at steps 620, 622, 626, and 626, the originating device, at step 620, goes to a confirmation routine to transmit an originate request to answer message 420 from each of the active infrared ports to establish a successful wireless infrared communication link from one of the active infrared ports.

For each active infrared port until a successful link is established with one of the active infrared ports, the originating device enters the confirmation routine, at step 802, and then transmits an $IR_{OA}$ message 420 from the current infrared port being tested, at step 804. The originating device, at step 806, starts a timer to monitor a response from the specific answering device during a predetermined time interval. The originating device monitors the current active infrared port, at step 808, to detect an $IR_{AO}$ message 410 from the current infrared port being tested, at step 810. The originating device continues to monitor the current infrared port until the end of the predetermined time interval, as determined at step 812. If the originating device reaches the end of the predetermined time interval, at step 812, then it sets a value for a return parameter, at step 814, to indicate an unsuccessful attempt using the current infrared port. Then, at step 816, the routine returns the value of the return parameter to the operational sequence in FIG. 6 to indicate the unsuccessful attempt using the current infrared port, at step 622.

On the other hand, if the routine, at step 810, detects an $IR_{AO}$ message 410 from the current infrared port, then, at step 818, the routine marks a return parameter with a value to indicate that a successful infrared communication link has been established using the current infrared port, and then returns the value of the return parameter at step 816 to be tested in the operational sequence of FIG. 6, at step 622.

In summary, an originating device, such as the controller 206 of the selective call receiver 126, can utilize the exemplary operational sequence illustrated in FIG. 6 and FIG. 8 to attempt to establish a wireless infrared communication link with a specific answering device. Preferably, the wireless infrared communication link allows two-way wireless communication of wireless messages between the originating device and the answering device.

The answering device, for example, could comprise a controller (not shown in FIG. 1) for the base station 118 (FIG. 1), or alternatively could comprise a controller (not shown) for the other device 132, such as for a printer. The originating device automatically orients its pluridirectional wireless infrared communication interface to establish a directional wireless infrared communication link between the originating device and the specific answering device. That is, the originating device, for example, selects one of a plurality of wireless infrared communication ports to successfully establish a wireless infrared communication link with the specific answering device.

Although the originating device, in the preferred embodiment discussed above, determines that a wireless infrared communication link was established between the originating device and the answering device after transmitting the $IR_{OA}$ message 420 to a specific answering device and then receiving the $IR_{AO}$ message 410 from the specific answering device, other message handshaking schemes are contemplated according to the present invention. For example, the originating device can avoid waiting for the reception of the final $IR_{AO}$ message 410 from the specific answering device as discussed above. The originating device, in this alternative example, could establish the wireless infrared communication link after transmitting the $IR_{OA}$ message 420 to a specific answering device via a selected infrared port.

Figure 7:
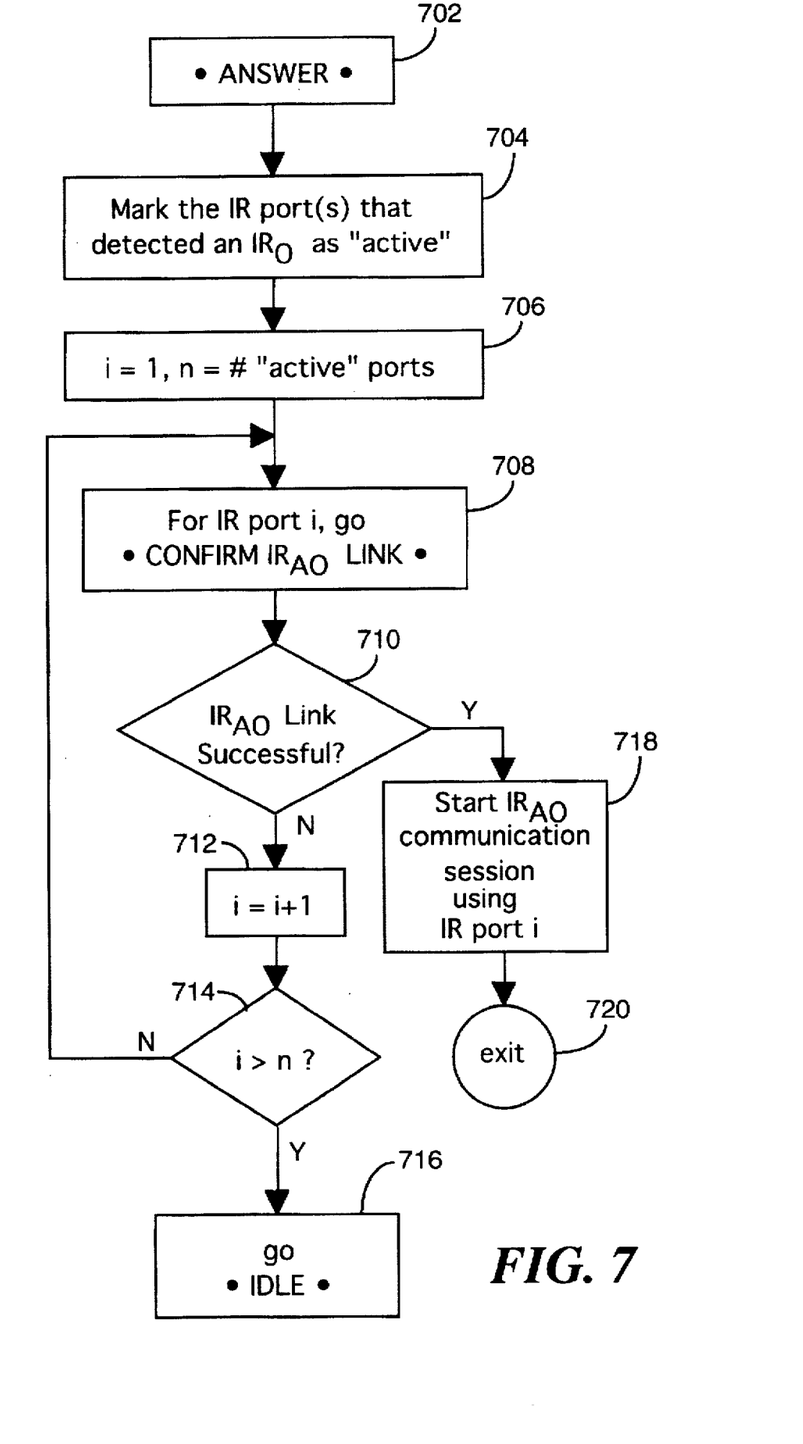
FIG. 7 is a flow diagram illustrating a first operational sequence for an answering device in accordance with the preferred embodiment of the present invention.
Figure 9:
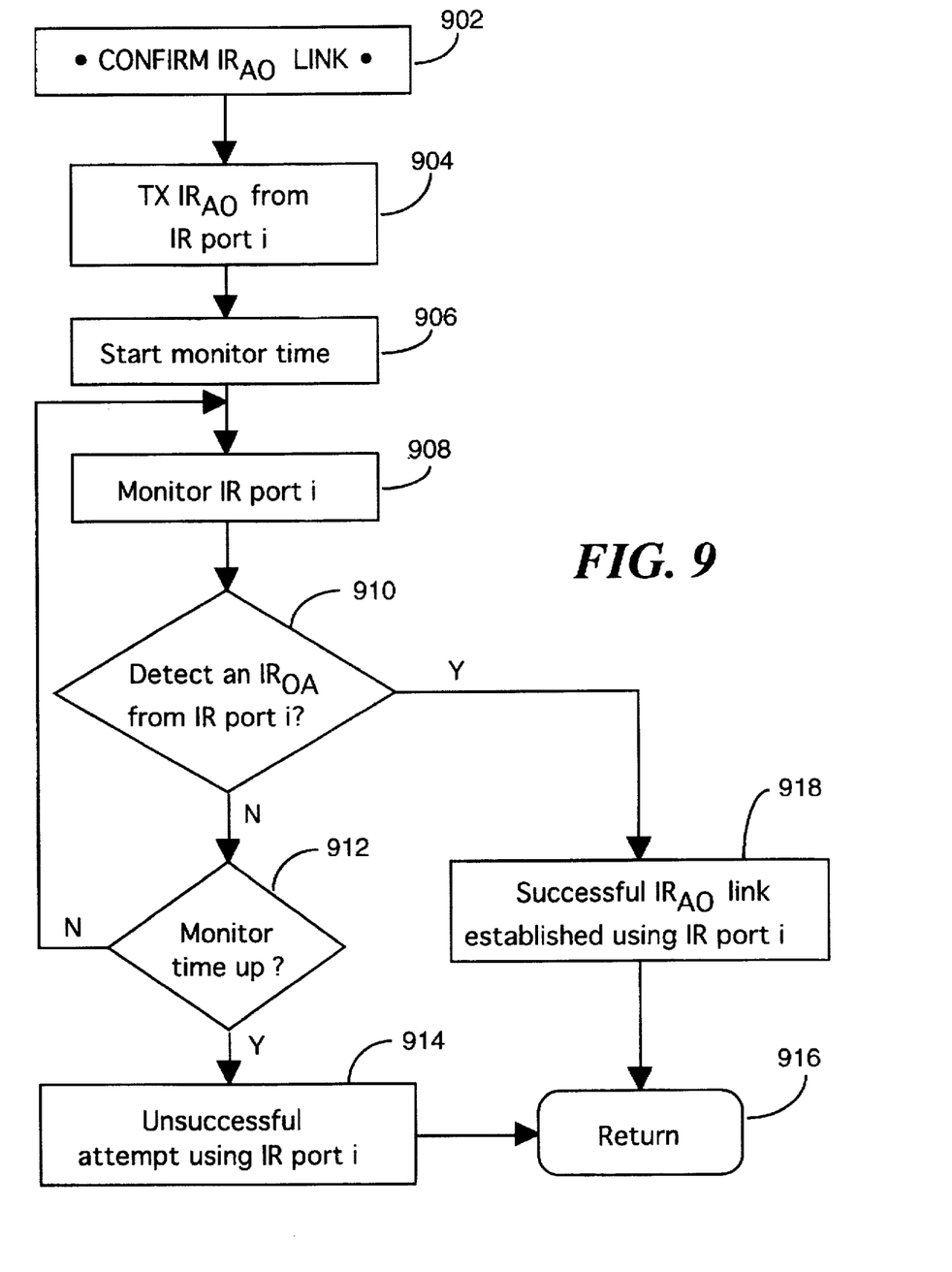
FIG. 9 is a flow diagram illustrating a second operational sequence for an answering device in accordance with the preferred embodiment of the present invention.

In the case of an answering device, referring now to FIG. 5, FIG. 7, and FIG. 9, the answering device, at step 512, goes to an answer routine for answering a received $IR_O$ message 400 to attempt to establish an infrared communication link with the originating device that transmitted the $IR_O$ message 400. The answer routine begins at step 702. The answering device, at step 704, marks all the infrared ports that detected an $IR_O$ message 400 as active. Then, the answering device, at step 706, begins with the first active port, and for each of the active ports, attempts to establish a successful wireless infrared communication link, at step 708, 710, 712 and 714. For each of the active infrared ports, at step 708, the answering device goes to a confirmation routine to attempt to establish a successful infrared communication link via the current active infrared port. If the answering device, at step 710 detects that a successful infrared communication link was established using the current active infrared port, then the answering device begins an infrared communication session with the originating device via the current active infrared port, at step 718. In the preferred embodiment discussed above, the answering device, at step 718, transmits an $IR_{AO}$ message 410 to the originating device via the selected current active infrared port. The $IR_{AO}$ message 410 establishes the wireless infrared communication link with the specific originating device. Then, the answering device exits the wireless interface orienting sequence, at step 720, to continue wireless message communication using the current active infrared port.

Although the answering device, in the preferred embodiment discussed above, establishes a wireless infrared communication link between the answering device and the originating device after transmitting the $IR_{AO}$ message 410 to the specific originating device, at step 718, other message handshaking schemes are contemplated according to the present invention. For example, the answering device can avoid transmitting the final $IR_{AO}$ message 410, at step 718. The answering device, in this alternative example, could establish the wireless infrared communication link after receiving the $IR_{OA}$ message 420 from the specific originating device via a selected infrared port.

If, after testing each of the active ports, at step 708, 710, 712, and 714, the answering device has not been able to establish a successful communication link with the originating device, at step 710, then the answering device, at step 716, goes back to the idle mode routine, at step 502.

For each of the active infrared ports, at step 708, the answering device goes to a routine that begins at step 902. For the current active infrared port, the answering device, at step 904, transmits an $IR_{AO}$ message 410 in response to receiving an originate request from the originating device.

Then, the answering device, at step 906, starts a timer to monitor the current active infrared port for a predetermined time interval. During the predetermined time interval, at step 908, the answering device monitors the current active infrared port to detect, at step 910, an $IR_{OA}$ message 420 from the originating device. If the answering device reaches the end of the predetermined time interval, at step 912, without detecting the $IR_{OA}$ message 420 from the originating device, then the answering device sets a value of a return parameter, at step 914, to indicate an unsuccessful attempt to establish a wireless infrared communication link via the current active infrared port. The routine returns the unsuccessful attempt value, at step 916, to be tested by the operational sequence at step 710. Alternatively, if during the predetermined time interval the answering device detects an $IR_{OA}$ message 420 via the current active infrared port, at step 910, then the routine sets a value of a return parameter, at step 918, to indicate a successful infrared communication link was established using the current infrared port. The successful value is then returned, at step 916, to be tested in the operational sequence at step 710.

In summary, the answering device utilizes the exemplary operational sequence shown in FIG. 7 and FIG. 9 to automatically orient a pluridirectional wireless infrared communication interface for the answering device to establish a successful wireless infrared communication link with the originating device. That is, the answering device automatically selects one of a plurality of wireless infrared communication ports to establish a directional wireless infrared communication link with the originating device. Preferably, the wireless infrared communication link allows two-way wireless communication of wireless messages between the answering device and the originating device.

The automatically orienting pluridirectional wireless infrared communication interface 220, provides significant advantages to a user of the device. First, the user does not necessarily have to point-and-shoot from an originating device to an answering device to establish a wireless infrared communication link therebetween. The user is spared from having to locate a potential answering device and from manually orienting a portable originating device to establish the wireless infrared communication link. Secondly, the originating device and the answering device may have identified more than one alternative active wireless infrared communication port during the automatic orientation operation. After selecting one of the plurality of active wireless infrared communication ports for establishing thereby the wireless infrared communication link, the originating device and the answering device have additionally marked the other alternative active wireless infrared communication ports to possibly re-establish an alternative wireless infrared communication link via one of the alternative active wireless infrared communication ports in the event that communication via the initially selected wireless infrared communication port is blocked or disrupted by interference. Communication can be blocked, for example, if a moving object is located between the originating device and the answering device during a communication session thereby blocking at least one directional infrared beam between the two devices. In such an event, the originating device and the answering device can quickly and efficiently re-orient their respective pluridirectional wireless infrared communication interfaces to re-establish communication therebetween. Thirdly, the automatically orienting pluridirectional wireless infrared communication interface 220 can enhance the reliability of communicating wireless messages between the originating device and the answering device because interference via one wireless communication link can be avoided and wireless messaging can continue via an alternative wireless communication link. Lastly, an originating device, or an answering device, may be able to simultaneously communicate with more than one other device. For example, an originating device can select a first one of the plurality of wireless infrared communication ports to communicate with an answering device, while utilizing a second one of the plurality of wireless infrared communication ports to communicate with another device. Further, the originating device can operate as an originating device via the first one of the plurality of wireless infrared communication ports while operating as an answering device via the second one of the plurality of wireless infrared communication ports. This communication topology is very flexible, and can extend an effective wireless communication link between an originating device and an answering device via at least one intermediate wireless communication link using at least one other device. That is, the at least one other device can operate as a repeater to relay wireless messages between the originating device and the answering device thereby extending the effective coverage of a wireless infrared communication link between an originating device and an answering device. The wireless communication path can even be extended around blocking structures and around corners and doorways inside buildings.

While a detailed description of a preferred embodiment of the invention has been given, it should be appreciated that many variations can be made thereto without departing from the scope of the invention as set forth in the appended claims. Further, the invention is not limited to selective call receivers, but can be used with other types of wireless communication devices, both fixed and portable, both wireless and wireline. Furthermore, the invention is not limited to wireless infrared communication, but can be used with other types of wireless communication technology, such as utilizing sound wireless communication including ultrasonic wireless communication, or electromagnetic wave wireless communication, including radio frequency wireless communication or laser wireless communication, or even a combination of various wireless communication technologies, where typically directional wireless communication is desired between devices.

What is claimed is:

1. A method in a selective call receiver, the selective call receiver having a memory and a pluridirectional wireless infrared communication interface, the pluridirectional wireless infrared communication interface having a plurality of directional wireless infrared communication ports, the method comprising the steps of:

(a) selecting one directional wireless infrared communication port of the plurality of directional wireless infrared communication ports of the pluridirectional wireless infrared communication interface;

(b) receiving a wireless message via the one directional wireless infrared communication port;

(c) determining, based on the wireless message, that the one directional wireless infrared communication port allows directional wireless infrared communication between the pluridirectional wireless infrared communication interface of the selective call receiver and a wireless infrared communication interface of a device, thereby producing a memory signal;

(d) in response to the memory signal, storing into the memory an identifier uniquely associated with the selected directional wireless infrared communication port;

(e) repeating steps (a) through (d) for each directional wireless infrared communication port of the plurality of directional wireless infrared communication ports of the pluridirectional wireless infrared communication interface, thereby forming a list in memory of the directional wireless infrared communication ports allowing directional wireless infrared communication with the wireless infrared communication interface of the device;

(f) establishing a wireless infrared communication link between the pluridirectional wireless infrared communication interface of the selective call receiver and the wireless infrared communication interface of the device through a directional wireless infrared communication port having an identifier stored in memory; and (g) upon a loss of the wireless infrared communication link established in step (f), re-establishing the wireless infrared communication link between the pluridirectional wireless infrared communication interface of the selective call receiver and the wireless infrared communication interface of the device through another directional wireless infrared communication port having an identifier stored in memory.

* * * * *